United States Patent
Droux et al.

(10) Patent No.: US 7,634,608 B2
(45) Date of Patent: Dec. 15, 2009

(54) BRIDGING NETWORK COMPONENTS

(75) Inventors: Nicolas G. Droux, Rio Rancho, NM (US); Sunay Tripathi, San Jose, CA (US); Kais Belgaied, Sunnyvale, CA (US); Erik Nordmark, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 169 days.

(21) Appl. No.: 11/479,948

(22) Filed: Jun. 30, 2006

(65) Prior Publication Data

US 2008/0005441 A1    Jan. 3, 2008

(51) Int. Cl.
G06F 13/36 (2006.01)
G06F 13/00 (2006.01)
G06F 15/16 (2006.01)
G06F 9/44 (2006.01)

(52) U.S. Cl. .................. 710/306; 710/316; 709/250; 719/324

(58) Field of Classification Search ................ 710/106, 710/301, 306, 313, 316; 709/217–218, 238, 709/242, 244–245, 249–250; 718/1; 719/319, 719/324

See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,711,163 B1* | 3/2004 | Reid et al. ................ | 370/390 |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,376,080 B1* | 5/2008 | Riddle et al. ............ | 370/229 |
| 7,502,884 B1* | 3/2009 | Shah et al. .............. | 710/316 |
| 2002/0120720 A1* | 8/2002 | Moir ........................ | 709/220 |
| 2003/0037154 A1 | 2/2003 | Poggio et al. | |
| 2003/0065676 A1* | 4/2003 | Gbadegesin et al. ..... | 707/104.1 |
| 2004/0267866 A1 | 12/2004 | Carollo et al. | |

(Continued)

OTHER PUBLICATIONS

Kagen, Michael. "IO Virtualization with Infiniband". Apr. 2005. Mellanox Technologies.*

(Continued)

Primary Examiner—Thomas J Cleary
(74) Attorney, Agent, or Firm—Osha • Liang LLP

(57) ABSTRACT

A system includes a first and a second network component, and a bridge. The bridge, which resides a Media Access Control (MAC) layer of a host, includes a bridge component, a first virtual network interface card (VNIC) and a second VNIC, wherein the first VNIC is associated with the first network component and the second VNIC is associated with the second network component. Further, the bridge component is configured to send packets received from the first network component to the second network component and to send packets received from the second network component to the first network component.

12 Claims, 11 Drawing Sheets

U.S. PATENT DOCUMENTS

| | | | |
|---|---|---|---|
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2005/0182853 A1* | 8/2005 | Lewites et al. | 709/238 |
| 2006/0041667 A1 | 2/2006 | Ahn et al. | |
| 2006/0045089 A1 | 3/2006 | Bacher et al. | |
| 2006/0070066 A1 | 3/2006 | Grobman | |
| 2006/0174324 A1 | 8/2006 | Zur et al. | |
| 2006/0182853 A1* | 8/2006 | Kawai et al. | 426/291 |
| 2006/0206300 A1* | 9/2006 | Garg et al. | 703/27 |
| 2006/0209718 A1* | 9/2006 | Kinsey et al. | 370/254 |
| 2006/0233168 A1* | 10/2006 | Lewites et al. | 370/389 |
| 2007/0130352 A1* | 6/2007 | Chhabra et al. | 709/230 |
| 2007/0280243 A1* | 12/2007 | Wray et al. | 370/392 |

OTHER PUBLICATIONS

"Solaris Networking—The Magic Revealed (Part I)"; Sunay Tripathi's Solaris Networking Weblog; Nov. 14, 2005, pp. 1-22 (22 pages).

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

Tripathi, S.: "Crossbow: Network Virtualization and Resource Control"; presented at Sun Labs Open House; Jun. 1, 2006; 24 pages.

* cited by examiner

BRIDGING NETWORK COMPONENTS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; and "Serialization Queue Framework for Transmitting Packets" with U.S. application Ser. No. 11/479,143.

BACKGROUND

Network traffic is transmitted from a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a system. The system includes a first and a second network component, and a bridge comprising a bridge component, a first virtual network interface card (VNIC) and a second VNIC, wherein the first VNIC is associated with the first network component and the second VNIC is associated with the second network component, wherein the bridge component is configured to send packets received from the first network component to the second network component and to send packets received from the second network component to the first network component, wherein the bridge is located in a Media Access Control (MAC) layer of a host.

In general, in one aspect, the invention relates to a method for sending a packet. The method includes receiving the packet, processing the packet, wherein processing the packet includes obtaining a hardware address (HA) corresponding to a destination IP address of the packet, obtaining, using the hardware address, an entry in the Vswitch table associated with the HA, wherein the entry indicates that the packet is to be sent to a first virtual network interface card (VNIC) associated with a bridge, sending the packet to the first VNIC in accordance with the entry, receiving the packet by the first VNIC, sending the packet from the first VNIC to a second VNIC associated with the bridge, and sending the packet, using the HA, from the second VNIC to a destination associated with the HA, wherein the first VNIC is associated with a first network component and the second VNIC is associated with a second network component, and wherein the packet is received from a VNIC associated with the first network component.

In general, the invention relates to a method for receiving a packet. The method includes receiving the packet, comprising a hardware address (HA), by a first network component, wherein the HA is associated with a virtual network interface card (VNIC) associated with a second network component, sending the packet to a second VNIC associated with the first network component, wherein the second VNIC is associated with a bridge, receiving the packet by the second VNIC, sending the packet to a third VNIC, wherein the third VNIC is associated with the bridge and the second network component, receiving the packet by the third VNIC, sending the packet from the third VNIC to the first VNIC using the HA.

Other aspects of the invention will be apparent from the following description and the appended claims.

DETAILED DESCRIPTION

Figure 1:
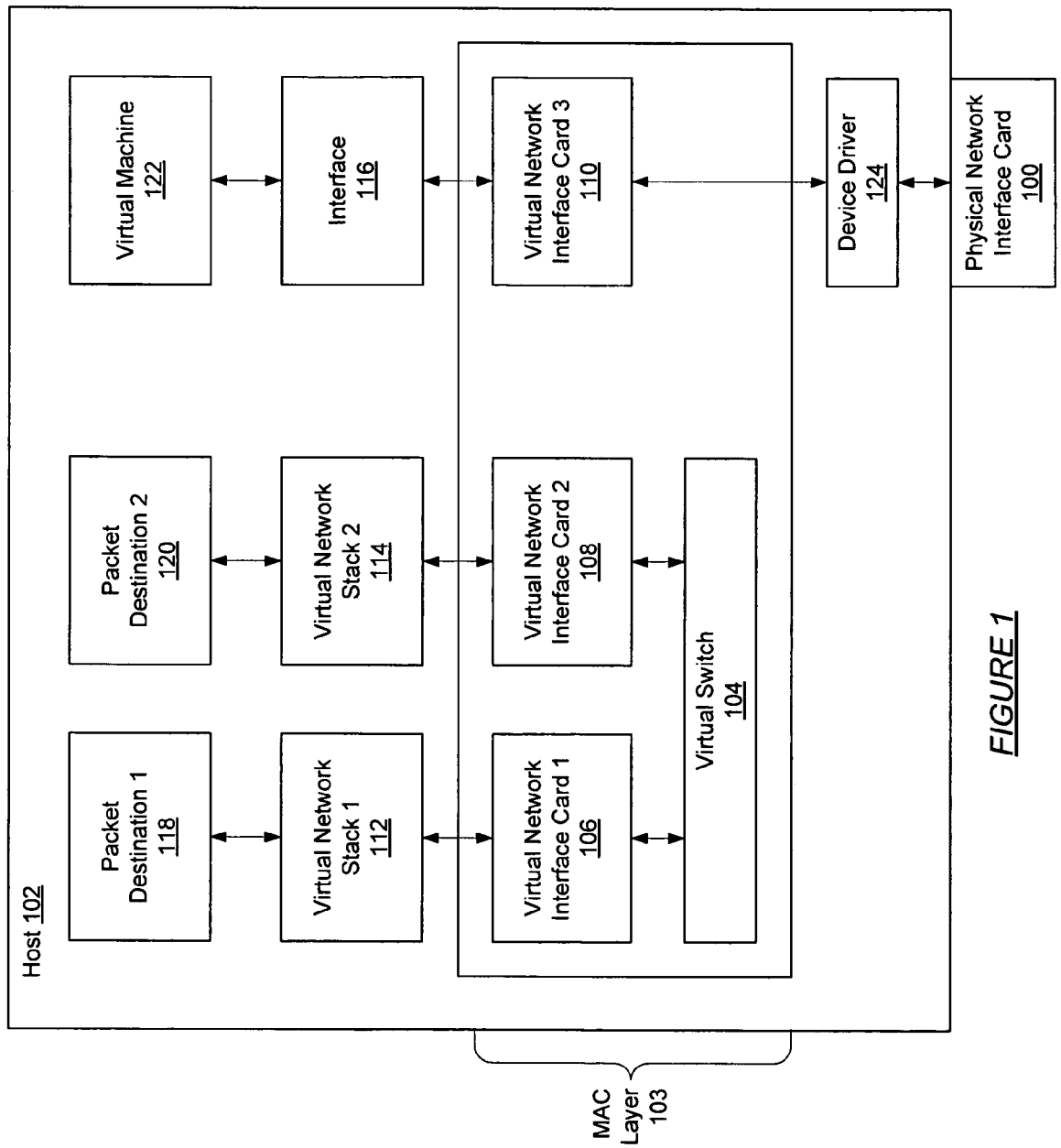
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for bridging network components on a host. More specifically, embodiments of the invention relates to a method for enabling communication between virtual network components, physical network components, and any combination thereof in a Media Access Control (MAC) layer on the host.

In one embodiment of the invention, a bridge is provided from enabling communication between various network components (virtual and/or physical).

In general, the bridge enables isolated network components (e.g., physical network interface cards (NICs), Virtual NICs (VNICs), and VNICs connected to virtual switches) to communicate.

In general, embodiments of the invention relate to a virtual switch. More specifically, embodiments of the invention provide a mechanism to create a virtual network within a host, where the virtual network includes two or more virtual machines (or packet destinations) operatively connected to the virtual switch. In one or more embodiments of the invention, the virtual switch restricts communication within the host such that only virtual machines (or packet destinations) operatively connected to the virtual switch may communicate with each other. Said another way, a virtual machine (or packet destination) is not able to communicate with another virtual machine (or packet destination) on the host unless the other virtual machine (or packet destination) is connected to the same virtual switch. Further, embodiments of the invention enable a virtual network within the host to be isolated from communication between the host and the external network (e.g., a Local Area Network (LAN), Wide Area Network (WAN), etc.).

FIG. 1 shows a system in accordance with one embodiment of the invention. As shown in FIG. 1, the system includes a host (100) operatively connected to a physical network interface card (NIC) (100).

In one embodiment of the invention, the physical NIC (100) is configured to receive packets from a network (not shown) (e.g., a LAN, a WAN, etc.) and send the received packets to the host (102). Further, the physical NIC (100) is also configured to receive packets from the host (102) and send the packets towards their intended destination on the network (not shown).

In one or more embodiments of the invention, the host (102) includes a device driver (124), a Media Access Control (MAC) layer (103), a number of virtual network stacks (VNSs) (112, 114, 116), one or more packet destinations (PD) (118, 120), and one or more number of virtual machines (VM) (122). Each of the aforementioned components is discussed below.

In one or more embodiments of the invention, the device driver (124) provides an interface between the host (102) and the physical NIC (100). More specifically, the device driver (124) includes functionality to obtain packets from the physical NIC (100) and send the packets to the appropriate location in the host (102). Further, the device driver (124) includes functionality to send packets from the host (102) to the physical NIC (100).

In one embodiment of the invention, the MAC layer (103) includes a virtual switch (104) and a number of virtual network interface cards (VNICs) (106, 108, 110). While FIG. 1 only shows a single virtual switch, the host (102) may include multiple virtual switches.

In one or more embodiments of the invention, the virtual switch (104) corresponds to a name used in host (102) to conceptually identify a virtual switch.

The MAC layer (103) includes a Vswitch table that tracks which VNICs (106, 108, 110) are associated with the virtual switch and, thus, are able to communicate with each other.

More specifically, in one embodiment of the invention, each virtual switch (104) is associated with a Vswitch table, where the Vswitch table includes an entry for each VNIC (106, 108, 110) associated with the virtual switch (104). Thus, by adding an entry to a Vswitch table associated with a virtual switch (104), the VNIC identified in the entry is now able to conceptually link to the virtual switch and, accordingly, is able to communicate with the other VNICs associated with the virtual switch (104). In view of the above, the arrows showing a link between the virtual switch (104) and the VNICs (106, 108) in FIG. 1, correspond to conceptual links, where the links are realized through the entries in the associated Vswitch table.

Continuing with the discussion of the Vswitch table, each of the aforementioned entries includes a hardware address (HA) (e.g., MAC address) associated with the VNIC (106, 108, 100). In addition, each of the aforementioned entries includes a pointer to the VNIC data structure (i.e., a data structure associated with the VNIC). In one embodiment of the invention, VNIC data structure includes a function to execute to send a packet to the VNIC.

In one embodiment of the invention, each entry in the Vswitch table satisfies the following conditions: (i) the entry is associated with VNIC; (ii) the VNIC is associated with the virtual switch; and (iii) the VNIC and virtual switch reside on the same host. In one embodiment of the invention, a single Vswitch table may exist for all VNSs on a given virtual switch or for VNS on the host.

In one embodiment of the invention, as additional VNICs are associated with the virtual switch (104) or as VNICs association with the virtual switch (104) are removed, the Vswitch table is updated accordingly. In one embodiment of the invention, a single Vswitch table may exist for all virtual switches on the host. In one embodiment of the invention, the Vswitch table is located in the MAC layer (103).

In one embodiment of the invention, each VNIC (106, 108, 110) is located in the MAC Layer (103) and includes the functionality of a physical NIC (100). Said another way, to all components above the VNIC (106, 108, 110) (e.g., the VNSs and the VMs), the VNICs appear as physical NICs. In one embodiment of the invention, each VNIC is assigned a unique hardware address (e.g., a MAC address) and an Internet Protocol (IP) address. The use of the term "unique" is intended to covey that the each IP and MAC address is unique with respect to the host but may not be unique with respect to all other IP or MAC addresses present on systems operatively connected to the host via the network. Continuing with the discussion of FIG. 1, each VNIC (106, 108, 110) is configured to send and receive packets from a VNS (112, 114) or is configured to send and receive from a virtual machine (122) via an interface (116). Further, VNICs (106, 108) associated with the virtual switch (104) are configured to access the Vswitch table.

In one embodiment, as shown in FIG. 1, a VNIC (106) may be associated a VNS (112, 114). VNSs are discussed below in FIG. 2. Further, each VNS (112, 114) may be associated with a packet destination (118, 120). In embodiment of the invention, the packet destination (118, 120) corresponds to any process executing in the host (102), which is configured to receive packets and does not include its own VNS.

As discussed above, a VNIC (110) may be connected to an interface (116) which, in turn, is connected to a virtual machine (VM) (122). In one embodiment a VM (122) corresponds to an isolated software emulation environment, where the software emulation environment emulates a physical execution environment. Thus, to an application executing in the VM (122), the VM (122) appears as a physical execution environment. Further, each VM (122) typically includes an operating system (OS), where the OS is not necessarily the same as the OS of the host (102). The VM (122) typically includes a virtual network stack (not shown). In one embodiment of the invention, the VM (122) or an application executing in the VM (118) includes functionality to issue packets, where the packets are sent from the VM (122) to the interface (116) with which the VM is associated. Once the packet is received by the interface (116), the packet is sent, if appropriate, towards the associated VNIC (106, 108, 110). The VNIC (106, 108, 110), upon receipt of the packet, sends the packet towards the packet destination. This processing of packets is discussed below in FIGS. 3 and 4.

Figure 2:
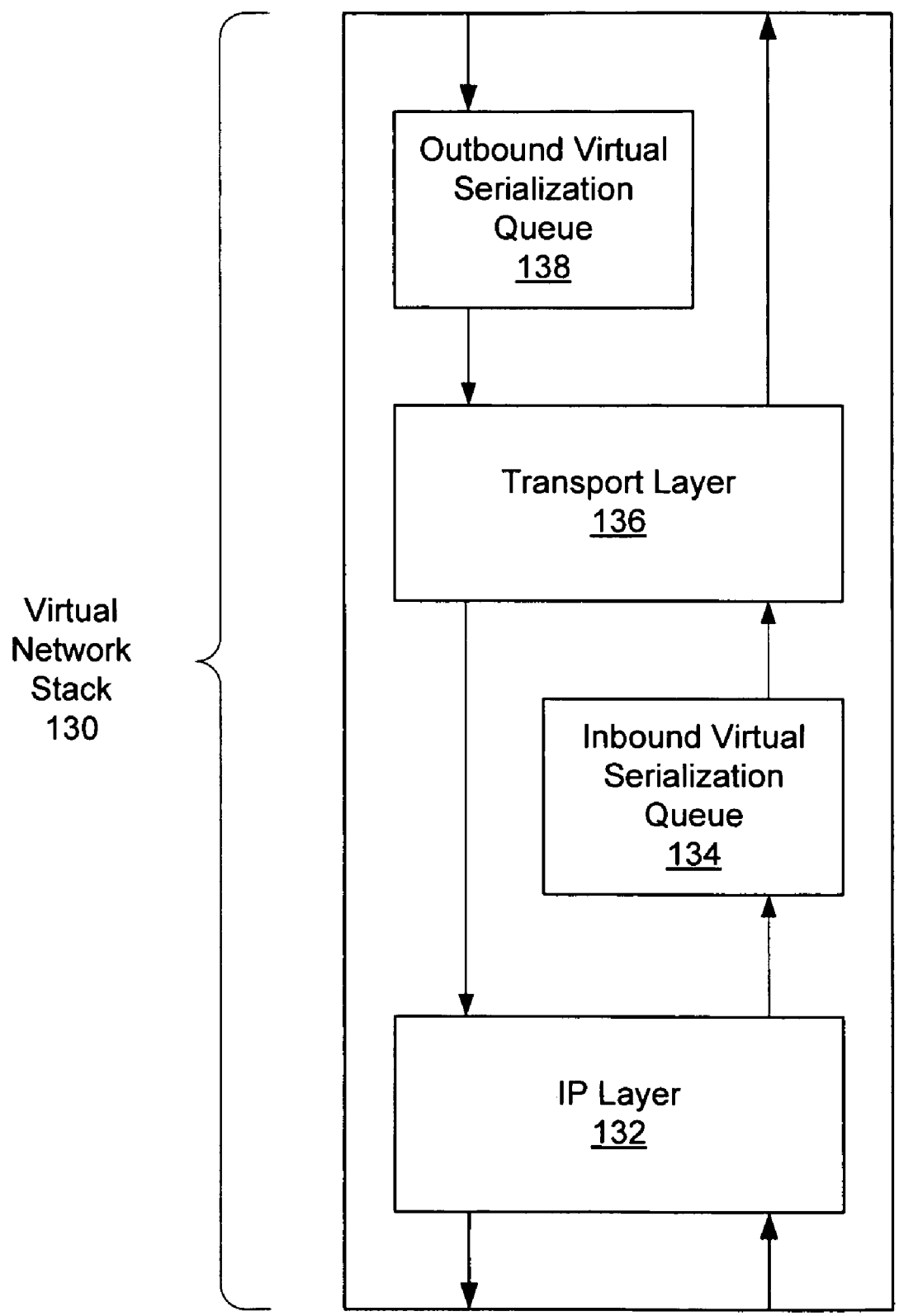
FIG. 2 shows a virtual network stack in accordance with one embodiment of the invention.

FIG. 2 shows a virtual network stack (VNS) in accordance with one embodiment of the invention. In one embodiment of the invention, the VNS (130) includes an Internet Protocol (IP) layer (132), an inbound virtual serialization queue (134), a transport layer (136), and an outbound serialization queue (138). Each of the aforementioned components is discussed below.

In one embodiment, the IP layer (132) is configured to receive packets from the VNIC associated with the VNS (134) (e.g., VNS 1 (112) receives packets from VNIC (106) in FIG. 1). Further, the IP layer (132) is configured to receive packets from the transport layer (106). In one embodiment of the invention, the IP layer (132) is configured to perform IP level processing for both inbound and outbound packets.

In one embodiment of the invention, the IP layer (132) is associated with a hardware address-to-IP address mapping.

Continuing with the discussion of FIG. 2, the inbound VSQ (134) is configured to receive packets from the IP layer (132). The inbound VSQ (134) corresponds to a queue data structure and is configured to queue packets received from the IP layer (132) prior to the packets being processed by the transport layer (136). In one embodiment of the invention, the inbound VSQ (134) may be used to control the number of packets being received by the PD associated with VNS. The inbound VSQ (134) may control the bandwidth by limiting the number of packets in the VSQ (134) and preventing additional packets from entering the VNS (130) until the inbound VSQ (134) has less than a threshold number of packets.

In one embodiment of the invention, the transport layer (136) is configured to process inbound and outbound packets in accordance with Transmission Control Protocol (TCP), User Datagram Protocol (UDP), or both UDP and TCP.

In one embodiment of the invention, the outbound VSQ (138) is a queue data structure configured to receive packets from the PD with which the VNS (134) is associated. Further, the outbound VSQ (138) is configured store packets prior to sending the received packets to the transport layer (136). In one embodiment of the invention, the outbound VSQ (138) is also configured to control the flow of packets from the PD associated with the VNS (134) to the VNS (134). In one embodiment of the invention, the outbound VSQ (138) (or a related process) is configured to block an application for sending packets to the outbound VSQ (138), if the PD is attempting issue packets at a higher rate than the outbound bandwidth allocated to the PD. Further, the outbound VSQ (138) (or a related process) is configured to notify the PD when it (i.e., the PD) is no longer blocked from issuing packets to the VNS (134).

In one embodiment of the invention, the inbound VSQ (134) and outbound VSQ (138) are each configured to enforce the manner in which packets are processed. Specifically, the inbound VSQ (134) and outbound VSQ (138) may be configured to enforce the packet processing requirements imposed by the transport layer (136). For example, TCP requires serial processing of packets. Thus, the inbound VSQ (134) and outbound VSQ (138) may require all threads accessing the inbound VSQ (134) and outbound VSQ (138) to conform to a mutual exclusion policy. In one embodiment of the invention, the mutual exclusion policy requires that only one thread may access the VSQ at a time. Thus, if two threads are attempting to access a given VSQ, one thread must wait until the other thread has finished accessing the VSQ.

Alternatively, if the transport layer (136) only supports UDP, then the inbound VSQ (134) and outbound VSQ (138) may be configured to allow concurrent access. Said another way, two or more threads may concurrently access the VSQ. In one embodiment of the invention, if the transport layer (136) is configured to process both TCP and UDP packets, then the inbound VSQ (134) and outbound VSQ (138) are configured to conform to the more stringent standard (e.g., TCP if the transport layer supports both TCP and UDP).

Figure 3:
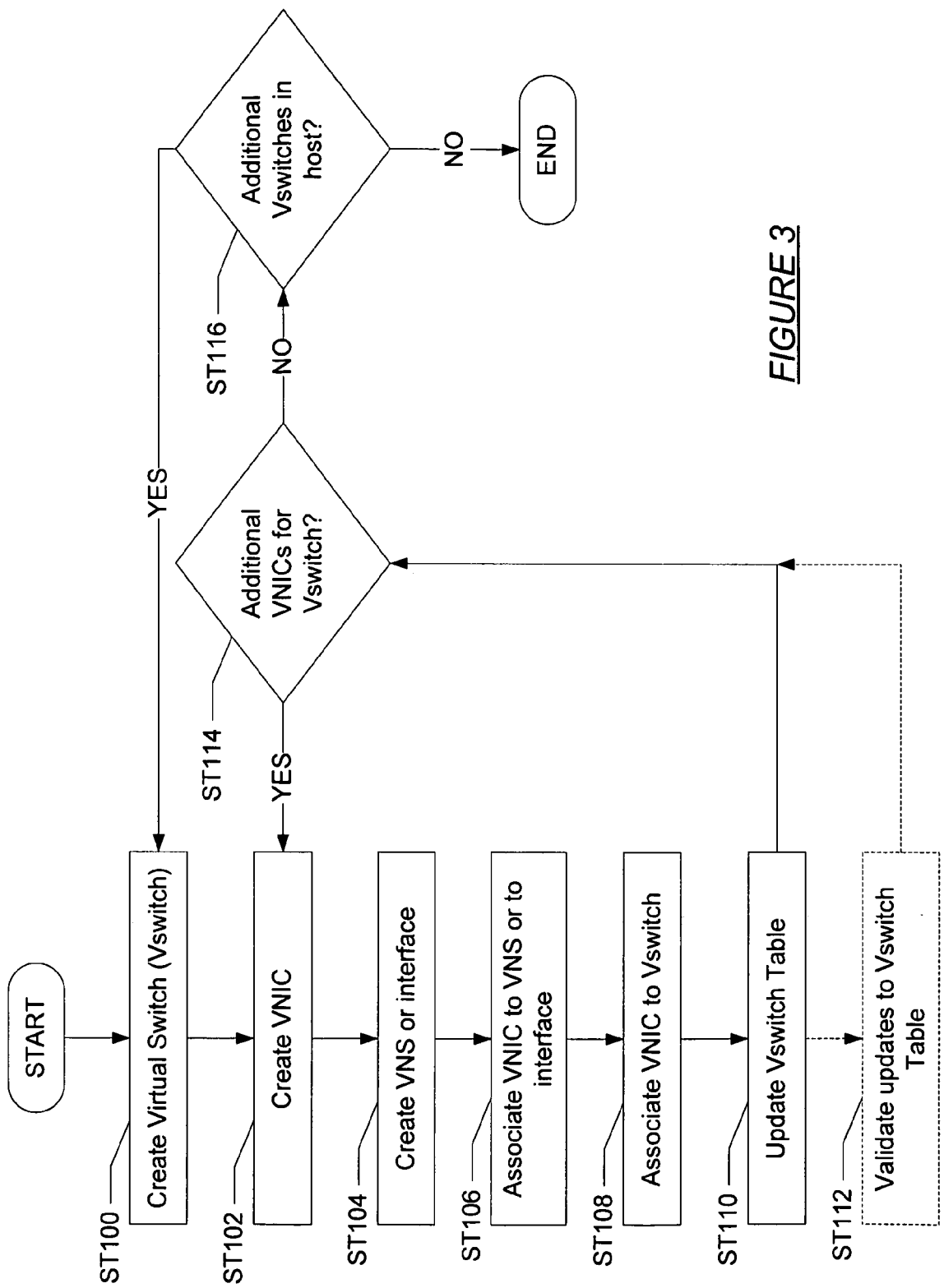
FIGS. 3 and 4 show flowcharts in accordance with one embodiment of the invention.

FIG. 3 shows a flowchart in accordance with one embodiment of the invention. More specifically, FIG. 3 shows a method for setting up a virtual switch in a host in accordance with one embodiment of the invention. Initially, a virtual switch (Vswitch) is created (ST100). In one embodiment of the invention, the creation of the Vswitch (i.e., designating a name for the virtual switch) instantiates the creation of a Vswitch table. A VNIC (ST102) and a VNS or interface (ST104) are subsequently created. In one embodiment of the invention, creating a VNIC includes assigning a MAC address and, optionally, an IP address to the VNIC. The VNIC is then associated with the VNS or the interface (ST106) and the VNIC is associated with the Vswitch (ST108).

At this stage, the Vswitch (or a related process) updates the Vswitch table (ST110). Specifically, an entry for correspond to the VNIC (i.e., the VNIC associated with the Vswitch in ST108) is added to the Vswitch table. The entry includes a MAC address of the VNIC as well as pointer to a VNIC data structure (i.e., a data structure associated with the VNIC), where the data structure includes a function to be invoked when sending a packet to the VNIC. In one embodiment each of the Vswitch table entries added in ST110 is validated to ensure that the entries are correct (ST112).

The process then proceeds to ST114, at ST114 a determination is made whether any other VNICs need to be created and associated with the Vswitch created in ST100. If additional VNICs are to be created, the process proceeds to ST102. Alternatively, if the additional VNICs do not need to be created (at least at this time), then the process proceeds to ST116.

At ST116, a determination is made whether additional Vswitches need to be created (at this time) in the system. If additional Vswitches do not need to be created, the process ends. Alternatively, if the additional Vswitches are required, the process proceeds to ST100.

In one embodiment of the invention, a virtual switch may be created at any time while the host is executing. Further, a VNIC may be associated with a virtual switch at any time or an association of a VNIC with the virtual switch may be removed at any time.

Figure 4:
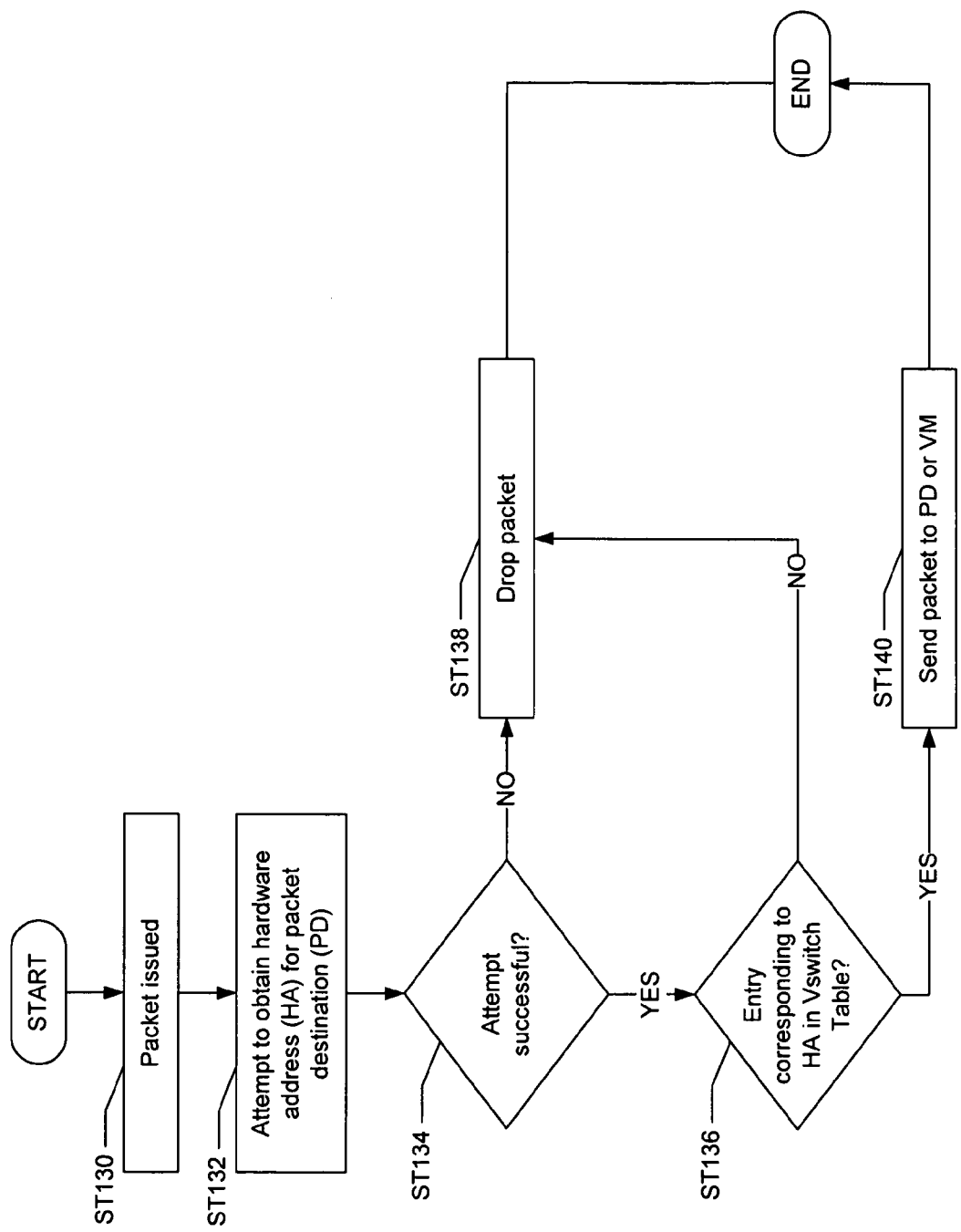

FIG. 4 shows a flowchart in accordance with one embodiment of the invention. More specifically, FIG. 4 shows a method for issuing a packet by a PD in accordance with one embodiment of the invention. Initially, a packet is issued by a PD, where the PD is associated with a VNIC and the VNIC is associated with a virtual switch (ST130). An attempt, by the VNS associated with the PD, is made to obtain the hardware address (HA) corresponding to a destination IP address of the packet (ST132). In one embodiment of the invention, ST132 includes (i) query an Address Resolution Protocol (ARP) table to determine the HA corresponding to the destination IP address and (ii) issuing an ARP request if the query in (i) is not successful. Issuing an ARP request includes sending a broadcast packet to the associated VNIC. The VNIC, upon receiving the broadcast packet, sends the broadcast packet to all VNICs associated with the virtual switch. If the destination IP address is associated with a VNIC associated with the virtual switch, then an ARP response including the HA of the aforementioned VNIC is generated and returned to the requesting VNIC. Alternatively, if the destination IP address is not associated with a VNIC associated with the virtual switch, then the ARP request fails and the HA is not obtained.

Returning to the discussion of FIG. 4, if the HA is obtained then the attempt to obtain the HA was successful (ST134) and the process proceeds to ST136. At ST136, the Vswitch table is queried to determine the presence of an entry that includes the HA. If such an entry is present, the packet is sent to the VNIC associated with the HA, once the packet reaches the VNIC the packet is sent to the PD or VM (ST140). As discussed above, the packet may be sent to the VNIC associated with the HA by executing a function located in a VNIC data structure referenced by a pointer in the aforementioned entry. The function, when executed, sends the packet to the VNIC associated with the HA. If an entry including the HA is not found in the Vswitch table, then the process proceeds to ST138. At ST138, the packet is dropped (i.e., not sent to the PD or VM associated with the destination IP address).

If the HA is not obtained then the attempt to obtain the HA was not successful (ST134) and the process proceeds to ST138. At ST138, the packet is dropped (i.e., not sent to the PD or VM associated with the destination IP address).

The following discussion details how a bridge may be used to enable communication between the various network components discussed above.

Figure 5:
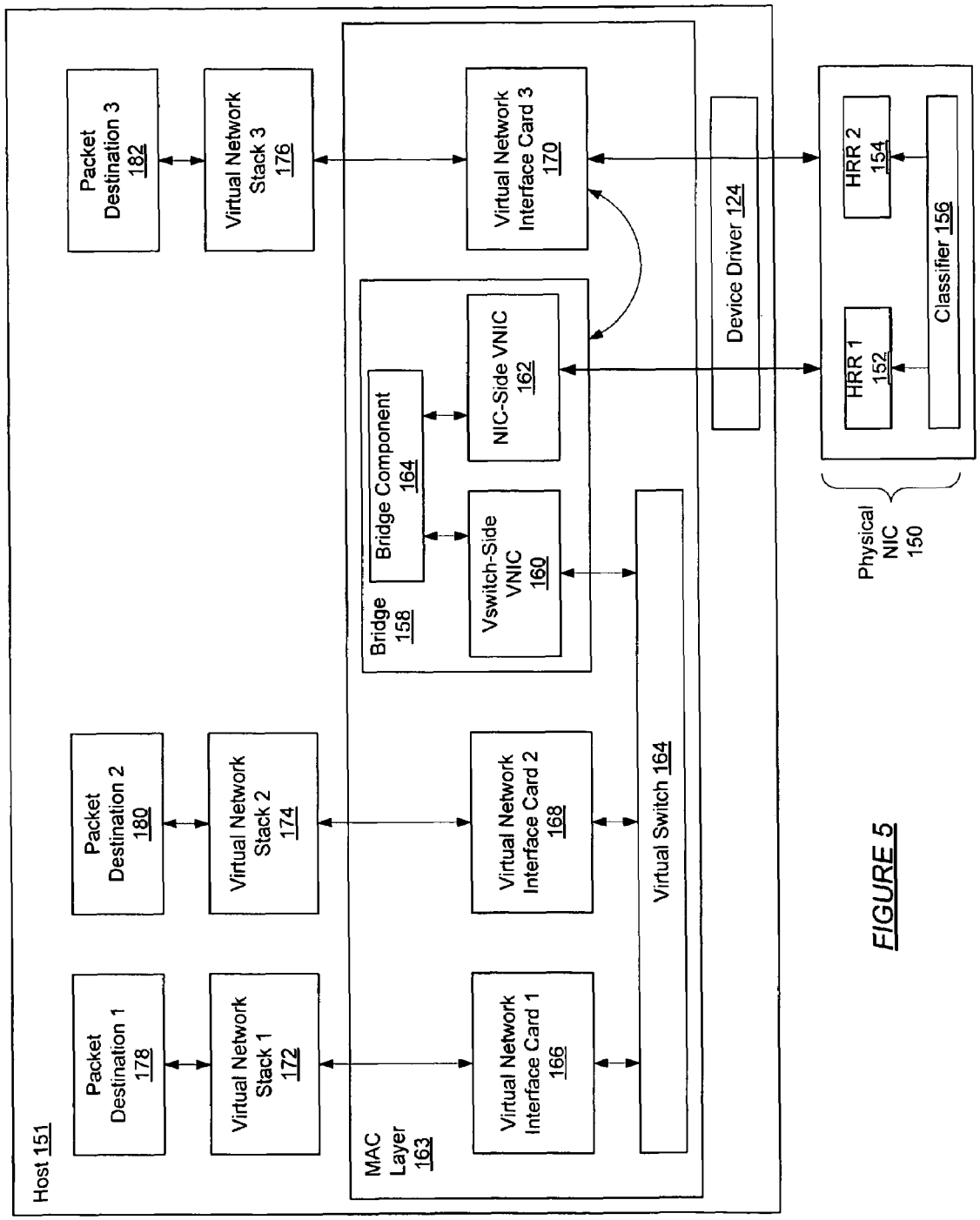
FIG. 5 shows a system in accordance with one embodiment of the invention.

FIG. 5 shows a system in accordance with one embodiment of the invention. More specifically, FIG. 5 shows a bridge configured to enable communication between a virtual switch and a physical NIC. As shown in FIG. 5, the system includes a physical NIC (150) operatively connected to a host (163). The physical NIC (150) includes a classifier (156) and a number of hardware receive rings (HRR) (152, 154).

In one embodiment of the invention, the classifier (156) is configured to classify incoming packets based on a hardware address associated with each packet. In one embodiment of the invention, the hardware address is a MAC address. Further, the classifier (156) is programmed to send all packets with hardware addresses associated with VNIC 1 (166) and VNIC 2 (168) to HRR 1 (152). Further, the classifier (156) is configured to send all packets associated with the hardware address corresponding to VNIC 3 (170) to HRR 2 (154). In one embodiment of the invention, each HRR (152, 154) is configured to temporarily store the classified packets prior to sending them to the host (151).

In one embodiment of the invention, the host (151) includes a device driver (124) (described above in FIG. 1), a number of VNICs (166, 168, 170) (described above in FIG. 1), a number of VNSs (172, 174, 176) (described above in FIG. 1), a virtual switch (164) (described above in FIG. 1), and a number of Packet Destinations (PDs) (178, 180, 182) (described above in FIG. 1). Further, the MAC layer (163) includes a bridge (158). In one embodiment of the invention, the bridge (158) corresponds to a MAC layer (163) component and includes a bridge component (164) and two VNICs (160, 162). In one embodiment of the invention, each of the VNICs in the bridge (158) is associated with one of the network components (e.g., a physical NIC, virtual switch, etc.) with which the bridge (158) is connected. In the FIG. 5, the bridge (158) includes a Vswitch-side VNIC (160) associated with the virtual switch (164) and a NIC-side VNIC (162) associated with the physical NIC (150). In one embodiment of the invention, each VNIC (e.g., 160, 162) associated with the bridge (158) is not visible to components outside of the MAC layer (163).

As shown in FIG. 5, the bridge (158) connects the VNICs (e.g., 166, 168) on the virtual switch (164) to the physical NIC (150). In one embodiment of the invention, the bridge component (164) is configured to send packets received from the one of the VNICs (e.g., 160, 162) associated with the bridge (158) to the other VNIC associated with the bridge (158). Further, the VNICs (160, 162) associated with the bridge are configured to send and receive packets for the packet destination (or virtual machine) using hardware addresses (e.g., MAC addresses) (described below in FIGS. 7-8).

Further, the bridge component (158) is configured to keep track of the VNIC and NICs on either side of the bridge (158). For example, bridge (158) in FIG. 5 includes information that indicates VNIC 1 (166) and VNIC 2 (168) are located on the Vswitch-side of the bridge (158) and that physical NIC (150) and VNIC 3 (170) are located on the NIC-side of the bridge (158). In one embodiment of the invention, the bridge component (158) is also configured to update the Vswitch table such that VNICs associated with a virtual switch (164) may send and receive packets from the bridge (158) (discussed below). In one embodiment of the invention, each host may include more than one bridge.

Figure 6:
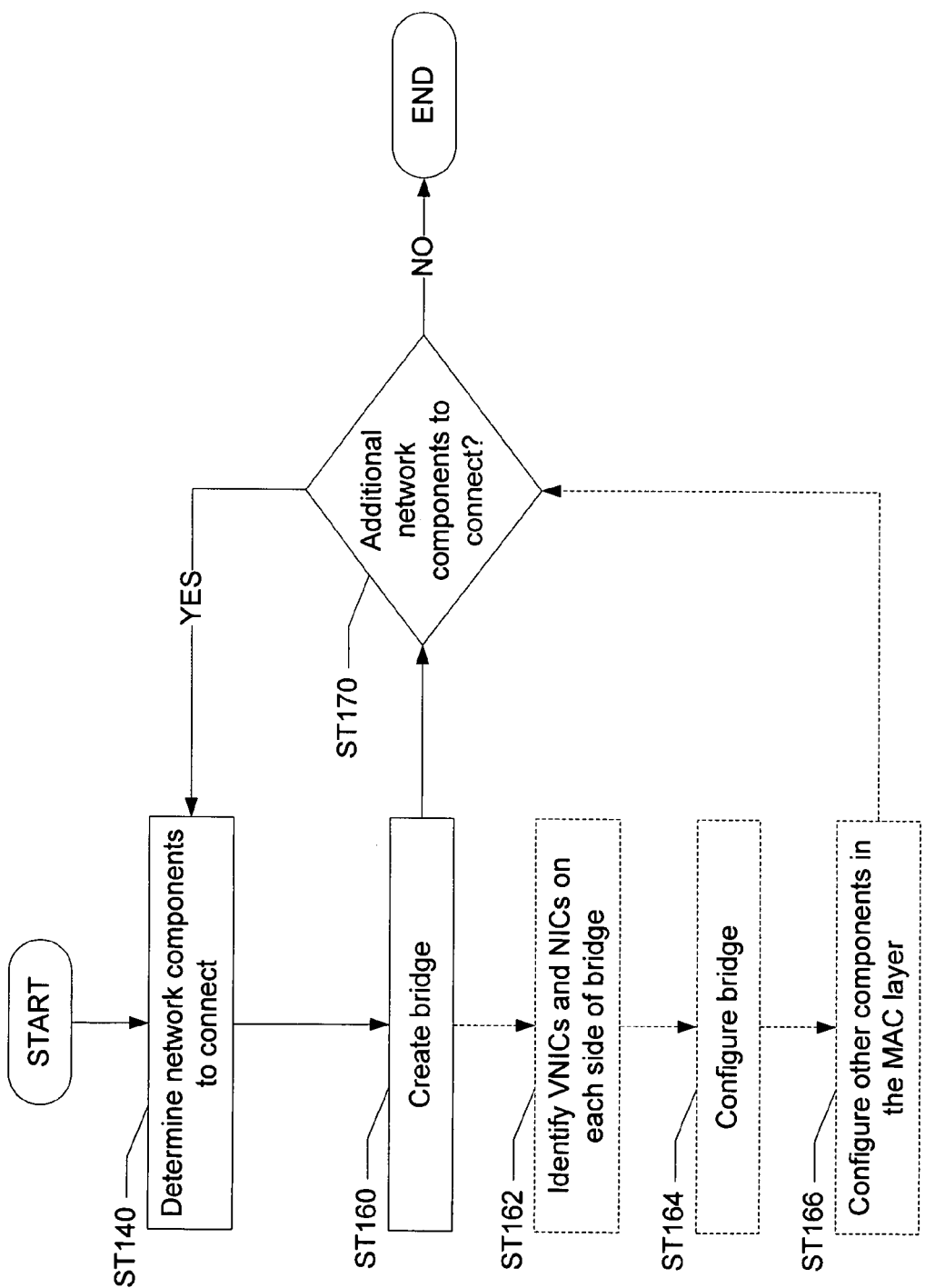
FIGS. 6-8 show flowcharts in accordance with one or more embodiments of the invention

FIG. 6 shows a flowchart in accordance with one embodiment of the invention. More specifically, shows a method for creating a bridge in accordance with one embodiment of the invention. Initially, the network components (e.g., physical NICs, virtual switches, etc.) needed to connect are determined (ST160). A bridge is subsequently created (ST162). In one embodiment of the invention, creating the bridge includes creating a bridge component and the two VNICs associated with the bridge component. Once the aforementioned components of the bridge are created they are bound to the network components identified in ST160.

Optionally, the bridge (or a related process) then proceeds to identify the VNICs and/or NICs on each side of the bridge (ST164). Once the VNICs and NICs are identified in ST166, the bridge is configured using the information about the VNICs and NICs (ST166). Specifically, the VNICs associated with the bridge may be associated with hardware addresses (HAs) (e.g., MAC addresses) corresponding to VNICs or NICs on the other side of the bridge. For example, the Vswitch-side VNIC may be associated with the HA of the NIC and of VNIC 3 (160). Finally, other components in the host may also be configured (ST168). For example, the Vswtich table associated with the virtual switch (164 in FIG. 5) may be updated to include an entry corresponding to the hardware address of the Vswitch-side VNIC (160).

Further, the Vswitch table may also include an entry corresponding to the hardware address for VNIC 3 (170 in FIG. 5), where the entry indicates that the Vswitch-side VNIC (160) is associated with the hardware address. Said another way, VNS 1 (172 in FIG. 1), by definition, can only communicate with other VNICs associated with the virtual switch (164), where the communication is restricted by the Vswitch table associated with the virtual switch (see discussion of virtual switches above). Accordingly, for PD 1 (178 in FIG. 5) to communicate with PD 3 (182 in FIG. 5), VNIC 1(166 in FIG. 5) must send a packet to the Vswitch-side VNIC (160), which is associated with the virtual switch (164). The sending of the packet to Vswitch-side VNIC (160) may be achieved by placing the aforementioned entry in the Vswitch table. Accordingly, Vswitch-side VNIC (160) may be associated with multiple hardware addresses, namely, its own hardware address and the hardware address of any other VNIC or NIC that is not associated with the virtual switch (164).

As an alternative to associating the Vswitch-side VNIC (160) with multiple hardware addresses, the Vswitch (after a bridge is created) may include a default entry, which results in a packet being sent to the Vswitch-side VNIC (160). Thus, any packet with a HA that is not associated with a VNIC on the virtual switch, is routed, using the default entry, to the Vswitch-side VNIC (160). The aforementioned configuration may also occur dynamically as discussed below in FIG. 8.

While the above discussion addressed configuration of a bridge (and related components in the host) when the bridge is connecting a virtual switch to a physical NIC, the aforementioned discussion may be applied to the configuration of a bridge (and related components in the host) when the bridge is connecting other network components (e.g., physical NIC-physical NIC (see FIG. 9), virtual switch-virtual switch (see FIG. 10), etc.).

Continuing with the discussion of FIG. 6, once the bridge is created (ST164) or after the optional steps have been performed (i.e., after ST168 has been performed), a determination is made whether there are additional network components to connect (ST170). If there are additional network components to connect, then the process proceeds to ST160. Alternatively, if there are no additional network components to connect, then the process ends.

Figure 7:
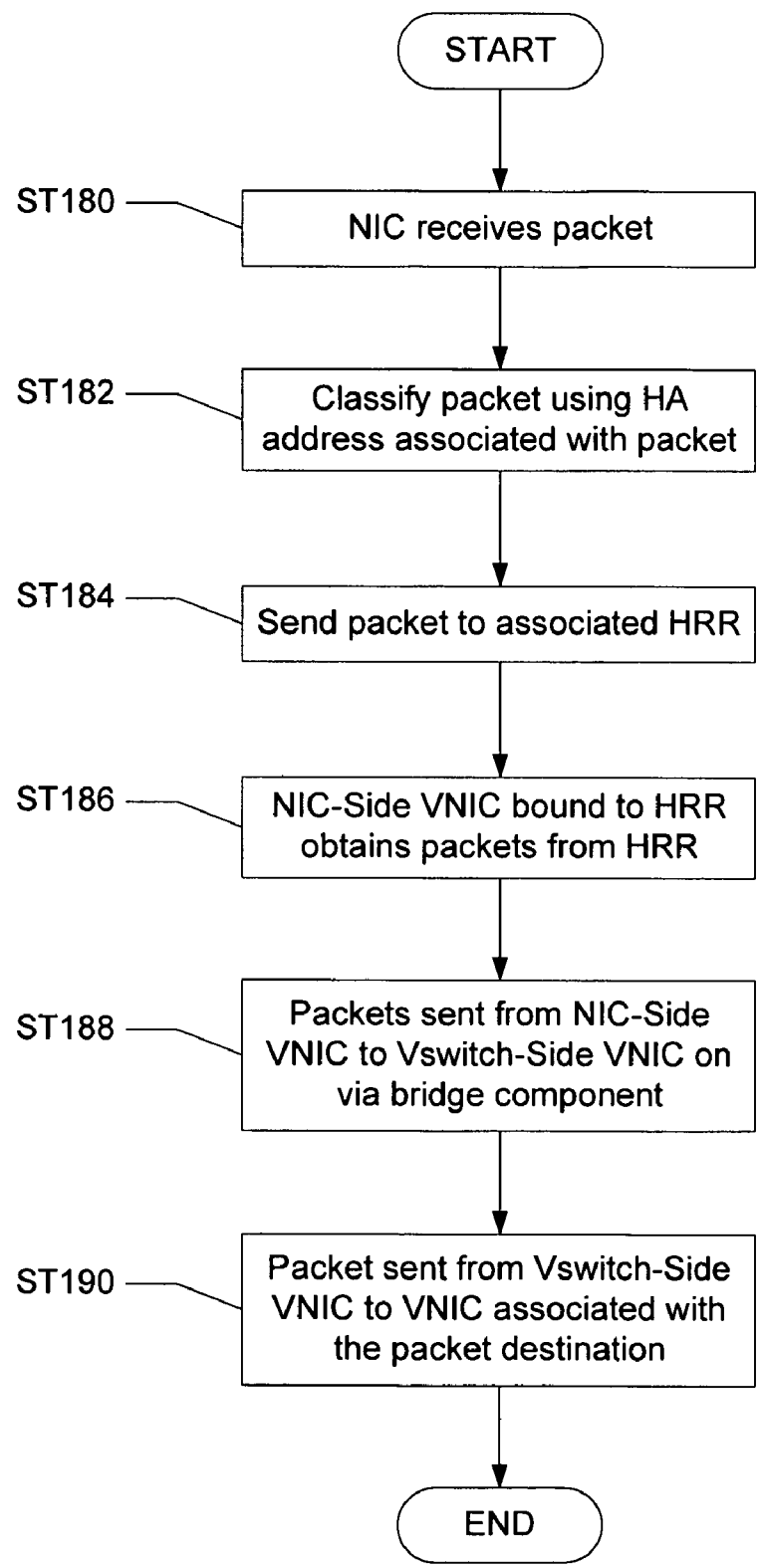

FIG. 7 shows a flowchart in accordance with one embodiment of the invention. More specifically, FIG. 7 shows a flowchart for receiving a packet from a network component that is not associated with the bridge in accordance with one embodiment of the invention. Initially, the NIC (e.g., 150 in FIG. 5) receives a packet, where the packet includes a hardware address. The packet is subsequently classified using the hardware address (ST162).

Continuing with the discussion of FIG. 7, once the packet has been classified, the packet is sent to an appropriate hardware receive ring (HRR) (e.g., 152 in FIG. 5) in the NIC (ST184). The NIC-side VNIC (e.g., 162 in FIG. 5) subsequently obtains the packet (using either interrupt mode or polling mode) from the HRR (i.e., the HRR to which the packet was sent in ST184) (ST186). In one embodiment of the invention, when the NIC-side VNIC uses polling mode, the NIC-side VNIC controls the rate at which packets are requested from the HRR. Thus, when NIC-side VNIC is operating in polling mode, packets remain in the HRR until the packets are requested from the NIC-side VNIC. Alternatively, when the NIC-side VNIC is operating in interrupt mode, each time a packet (or group of packets) is received, an interrupt is issued and the packet(s) is sent to the NIC-side VNIC. Thus, in interrupt mode the NIC-side VNIC does not have control of the number of packets it receives.

Returning to the discussion of FIG. 7, the packets are subsequently sent from the NIC-side VNIC to the Vswitch-side VNIC (e.g., 160 in FIG. 5) (ST188). In one embodiment of the invention, the bridge component includes functionality to determine when a packet is received by the NIC-side VNIC and to send the packet from the NIC-side VNIC to the Vswitch-side VNIC.

Once the Vswitch-side VNIC receives the packet, Vswitch-side VNIC sends the packet to the VNIC associated with the packet destination (ST190). In one embodiment of the invention, the Vswitch-side VNIC includes functionality to perform MAC layer routing using the HA associated with the packet.

Figure 8:
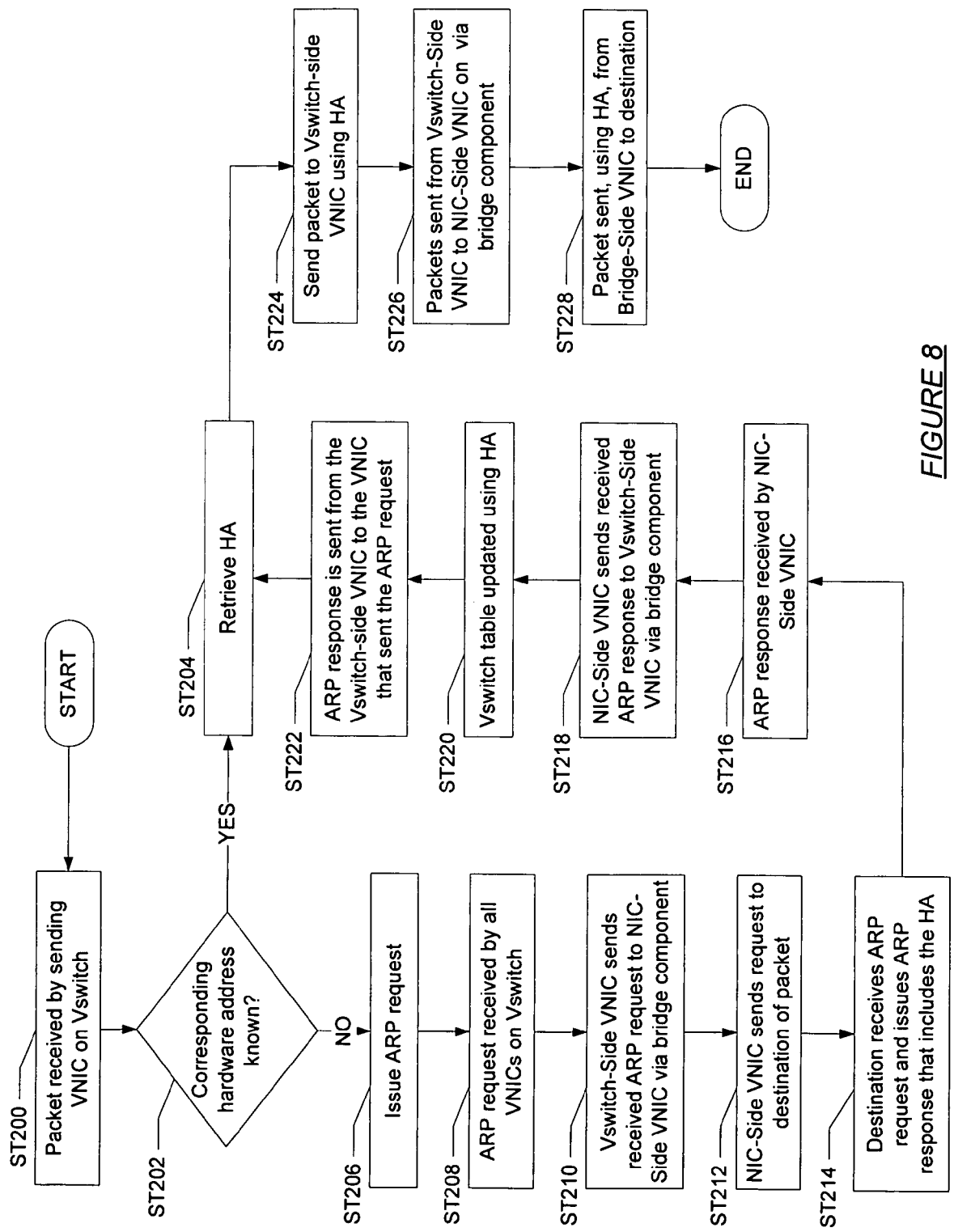

FIG. 8 shows a flowchart in accordance with one embodiment of the invention. More specifically, FIG. 8 shows a method for sending a packet from a VNIC on a virtual switch to a packet destination not associated with the virtual switch in accordance with one embodiment of the invention. Initially, a packet is received by a VNIC (e.g., 166 in FIG. 5) associated with a virtual switch (ST200). In one embodiment of the invention, the intended packet destination of the packet is identified by a destination Internet Protocol (IP) address. A determination is then made whether the hardware address associated with the destination IP address is known (ST202). In one embodiment of the invention, if the hardware address is known (e.g., it is located in an Address Resolution Protocol (ARP) table on the host), then the hardware address is retrieved (ST204). In one embodiment of the invention, the ARP table maintains an IP address-to-hardware address mapping.

Alternatively, if the hardware address is not known, then the hardware address is obtained using ST206-ST222 described below. Specifically, if the hardware address is not known then the VNIC (e.g., 172 in FIG. 5) issues an ARP request (ST206). In one embodiment of the invention, the ARP request corresponds to issuing a broadcast packet to all network components on the network. Accordingly, the ARP request is received by all VNICs associated with the virtual switch including the Vswitch-Side VNIC (ST208). The Vswitch-Side VNIC subsequently sends the ARP request to the NIC-Side VNIC via the bridge component (ST210). The NIC-Side VNIC then sends the ARP request to other network components including the destination, where the destination is directly or indirectly connected to the NIC-Side VNIC and is associated with the destination IP address (ST212).

Once the destination receives the ARP request, the destination issues an ARP response, where the ARP response includes the hardware address corresponding to the destination IP address (ST214). The ARP response is subsequently sent back towards the VNIC that originally issued the ARP request and is received by the NIC-Side VNIC (ST216). The NIC-Side VNIC upon receiving the ARP response sends the ARP response to the Vswitch-Side VNIC via the bridge component (ST218).

In addition, the Vswitch-Side VNIC updates (or requests another process) to updated Vswitch table to include an entry corresponding to HA, where the entry includes a function that, when executed, sends the packet to the Vswitch-Side VNIC (ST220). ST220 may not be performed if the Vswitch table includes a default entry, where the default entry is used whenever no entry corresponding to the hardware address exists in the Vswitch table. In such cases, the default entry instructs the VNIC to send the packet to the Vswitch-Side VNIC. The Vswitch-Side VNIC subsequently sends the ARP response to the VNIC that originally sent the ARP request (ST222).

Once ST222 has been performed, the process proceeds to ST204. As discussed above, at ST204 the hardware address is retrieved (e.g. from the ARP cache or from the ARP response). Once the hardware address is retrieved, the packet is sent to the Vswitch-Side VNIC using either an entry in the Vswitch table corresponding to the hardware address or a default Vswitch table entry (ST224) (See FIG. 4 for the operation of the virtual switch).

Once the packet is received by the Vswitch-Side VNIC, the packet is sent from the Vswitch-Side VNIC to the NIC-Side VNIC via the bridge component (ST226). The packet is subsequently sent from the NIC-Side VNIC towards the destination (ST228). In one embodiment of the invention, NIC-side VNIC includes functionality to send to the packet towards the destination using the hardware address.

In one embodiment of the invention, if the destination (e.g., a virtual machine or packet destination) is located on the same host as the VNIC from which the packet was sent, then the NIC-Side VNIC includes functionality to send the packet directly to the VNIC associated with the destination. In such cases, the packet sending occurs in the MAC layer.

The above discussion of the bridge focused on enabling communication between a VNIC on a virtual switch with a destination that is not associated with the virtual switch. In one embodiment of the invention, the bridge may be used to enable communication between any two network components located on a host. Specifically, FIG. 9 shows system in which a bridge connects two physical NICs and FIG. 10 shows a system in which a bridge connects to virtual switches.

Figure 9:
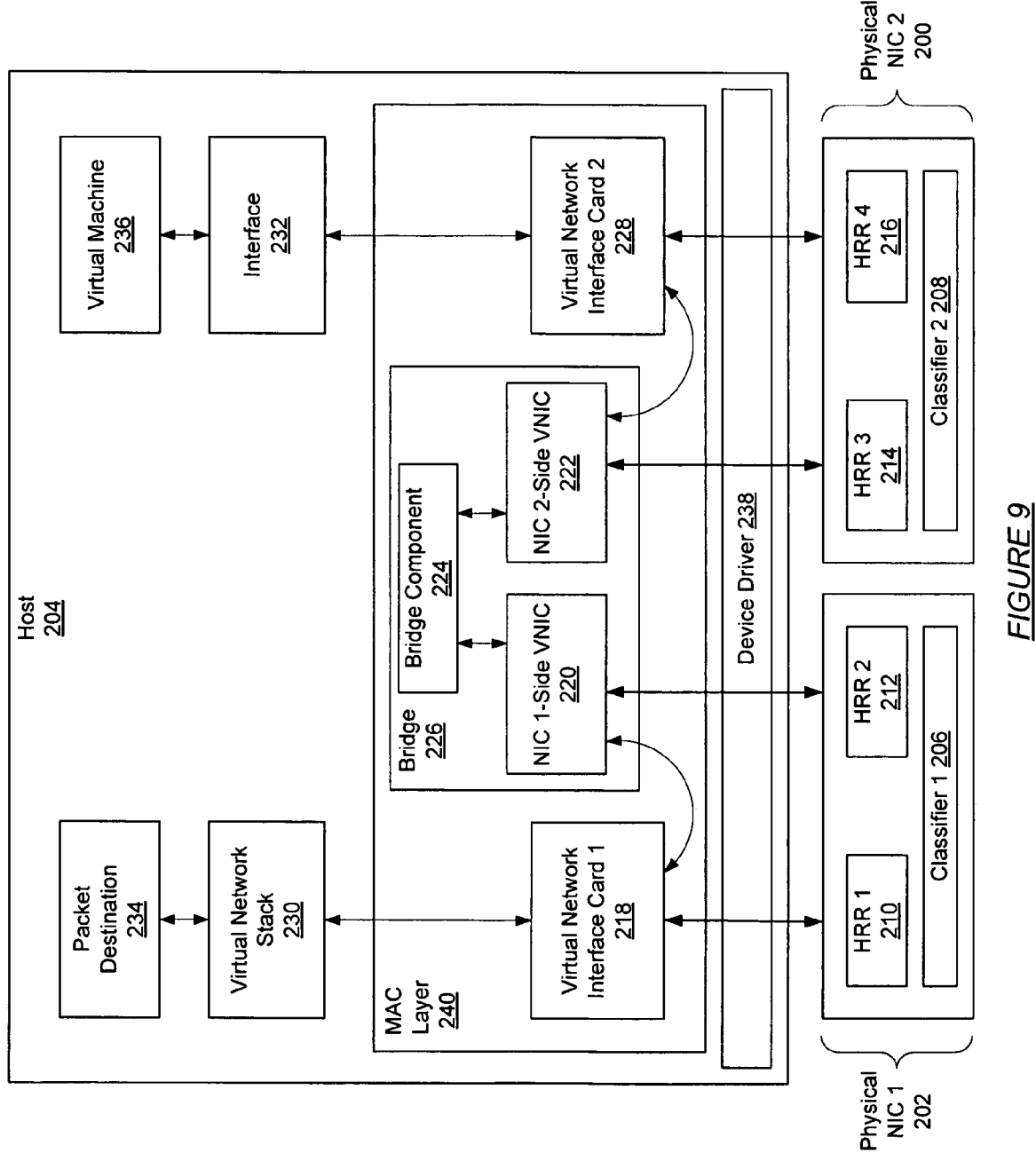
FIGS. 9 and 10 show systems in accordance with one or more embodiments of the invention.
Figure 10:
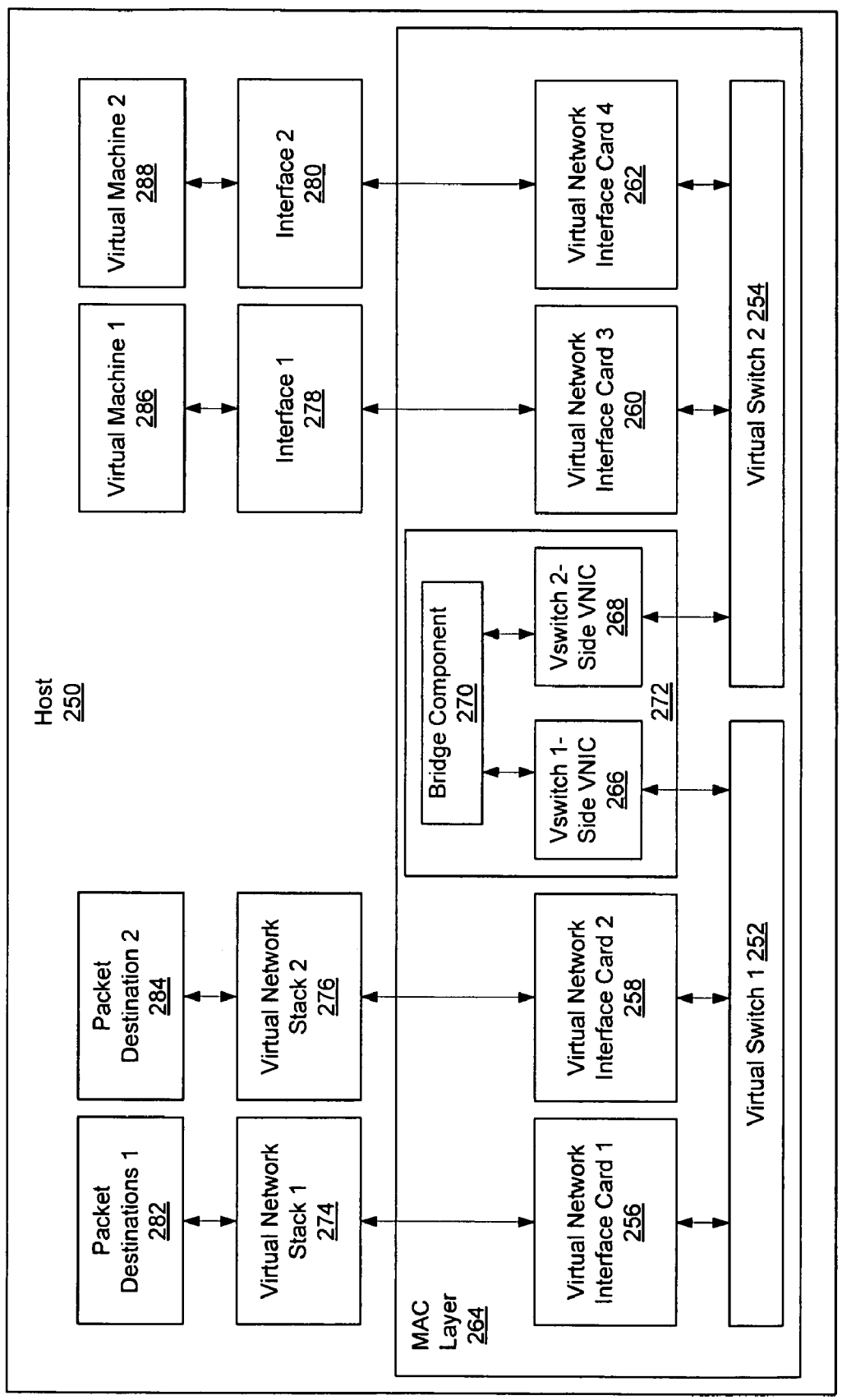

FIG. 9 shows a system in accordance with one embodiment of the invention. As shown in FIG. 9, the system includes two physical NICs (200, 202) operatively connected to a host (204). Further, physical NIC 1 (202) includes a classifier (206) and two hardware receive rings (HRRs) (210, 212). Further, the classifier (206) is configured to perform hardware address-based classification (e.g., using MAC addresses), such that all packets associated with the hardware address corresponding to VNIC 1 (218) are sent to HRR 1 (210) and all packets associated the hardware address corresponding to VNIC 2 (228) are sent to HRR 1 (212).

Similarly, physical NIC 1 (200) includes a classifier (208) and two hardware receive rings (HRRs) (214, 216). Further, the classifier (208) is configured to perform hardware address-based classification (e.g., using MAC addresses), such that all packets associated with the hardware address corresponding to VNIC 1 (218) are sent to HRR 3 (214) and all packets associated the hardware address corresponding to VNIC 2 (228) are sent to HRR 4 (216). In one embodiment of the invention, each of the aforementioned physical NICs may be associated with multiple VNICs. In such cases, the HRR in the physical NIC associated with the bridge (or more specifically, one of the VNICs on the bridge) is configured to receive packets, based on hardware address, of at least one VNIC on the opposite side of the bridge.

Continuing with the discussion of FIG. 9, the host includes a device driver(s) (238) (described above), a MAC layer (240), a VNS (230), an interface (232) (described above), a packet destination (234), and a VM (236) (described above). As shown in FIG. 9, the MAC layer (240) includes a number of VNICs (218, 228) (described above) and a bridge (226).

The bridge (226) includes a bridge component (224) (described above) two VNICs, namely, NIC 1-Side VNIC (220) and NIC 2-Side VNIC (222). The NIC 1-Side VNIC (220) and NIC 2-Side VNIC (222) are configured to perform the same functions as the VNICs in bridge described in FIG. 5.

The system in FIG. 9 allows PD (234) to send a packet to VM (236) using MAC layer (240) routing. Specifically, a packet issued from PD (234) for VM (236) is sent to VNS (230), then to VNIC 1 (218). Because VM (236) is located on the same host (204) as PD (234), the packet is sent to the bridge (226). The bridge (226), via the VNICs (220, 222) in the bridge (226), sends the packet to VNIC 2 (228). The packet is subsequently sent from VNIC 2 (228) to VM (236) (via interface (232)). In one embodiment of the invention, the system may use the method in FIG. 8 to send a packet from PD (234) to VM (236).

Further, the system shown in FIG. 9 enables a packet for VM (236) received by physical NIC 1 (202) to be sent to VM (236) using the method shown in FIG. 7.

FIG. 10 shows a system in accordance with one embodiment of the invention. The system shown includes a host (250), where the host (250) includes two virtual switches (252, 254) (described above), a number of VNICs (256, 258, 260, 262) (described above), a number of VNSs (274, 276), a number of PDs (282, 284), a number of interfaces (278, 280), and a number of VMs (286, 288). Further, the MAC layer (264) of the host (25) includes a bridge (272). As shown in FIG. 10, the bridge (272) includes a bridge component (270) (described above) and two VNICs (266, 268) (described above), namely, Vswitch 1-side VNIC (266) associated with virtual switch 1 (252) and Vswitch 2-side VNIC (268) associated with virtual switch 2 (254).

In one embodiment of the invention, the bridge (272) enables a PD associated with virtual switch 1 (252) to communicate with a VM associated with virtual switch 2 (254). For example, the bridge (272) enables PD 1 (282) to communicate with VM 2 (288). The methods for sending and receiving packets via the bridge correspond to the methods described in FIGS. 7 and 8 above.

Figure 11:
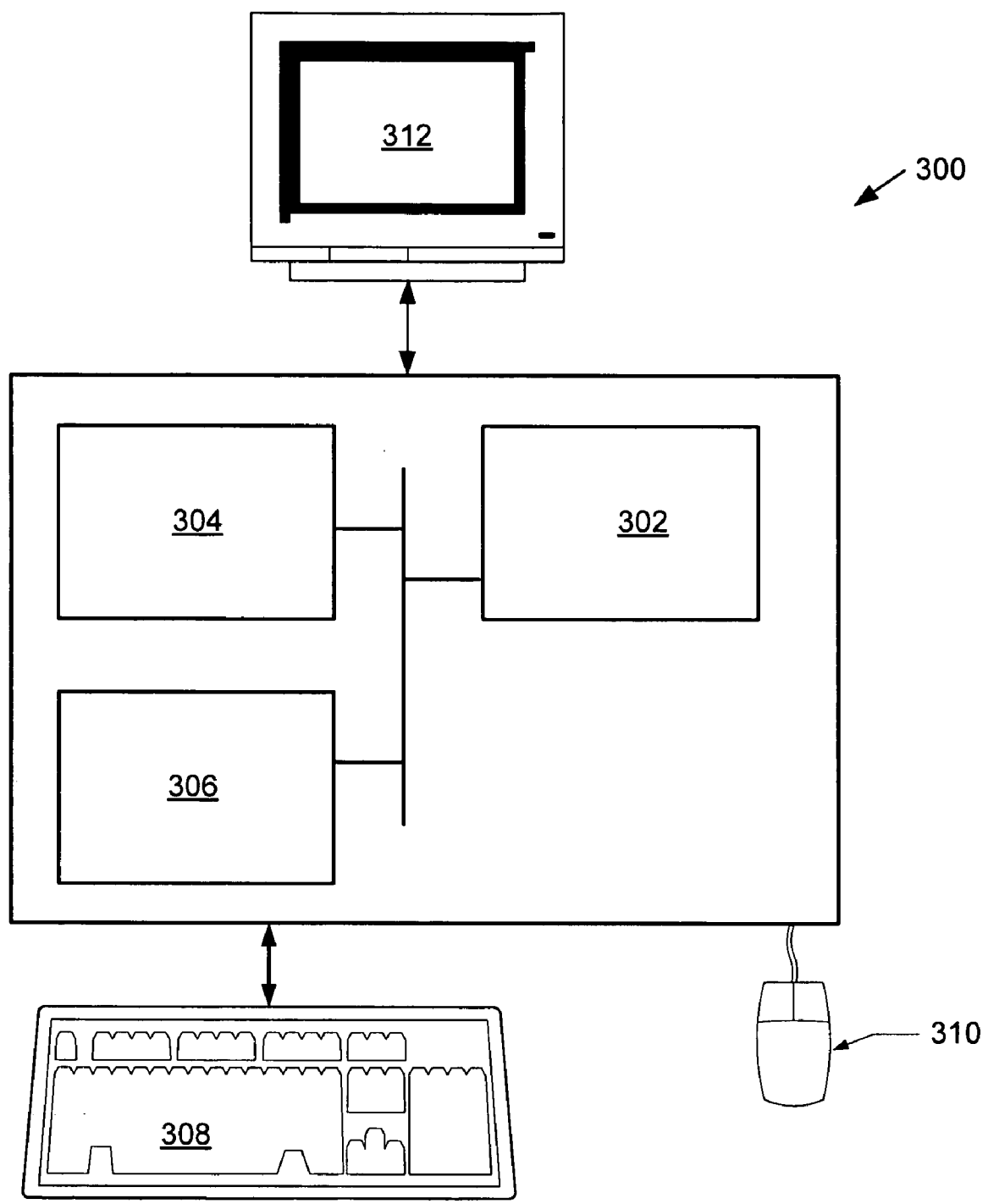
FIG. 11 shows a computer system in accordance with one embodiment of the invention.

An embodiment of the invention may be implemented on virtually any type of computer regardless of the platform being used. For example, as shown in FIG. 11, a networked computer system (300) includes a processor (302), associated memory (304), a storage device (306), and numerous other elements and functionalities typical of today's computers (not shown). The networked computer (300) may also include input means, such as a keyboard (308) and a mouse (310), and output means, such as a monitor (312). The networked computer system (300) is connected to a local area network (LAN) or a wide area network via a network interface connection (not shown). Those skilled in the art will appreciate that these input and output means may take other forms. Further, those skilled in the art will appreciate that one or more elements of the aforementioned computer (300) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
    a first and a second virtual network stack;
    a first packet destination logically connected to the first virtual network stack and a second packet destination logically connected to the second virtual network stack; and
    a media access control (MAC) layer, comprising:
        a first VNIC, wherein the first VNIC is logically connected to the first virtual network stack,
        a second VNIC, wherein the second VNIC is logically connected to the second virtual network stack, and
        a bridge comprising a bridge component, a third virtual network interface card (VNIC) and a fourth VNIC, wherein the third VNIC is logically connected to the first VNIC and the fourth VNIC is logically connected to the second VNIC,
        wherein the bridge component is configured to:
            receive a packet from the third VNIC, wherein the packet is received from the first packet destination using the first virtual network stack and the first VNIC, and
            send the packet to the second packet destination, wherein the packet is sent using the second VNIC and the fourth VNIC,
    wherein the first and second virtual network stacks and the MAC layer are located within a single execution environment in a host.

2. The system of claim 1, further comprising:
    a physical NIC operatively connected to the host,
    wherein the host further comprises a virtual switch,
    wherein the virtual switch is the second packet destination.

3. The system of claim 2, wherein the second VNIC is associated with the virtual switch.

4. The system of claim 2, wherein the virtual switch is associated with a plurality of VNICs and wherein a hardware receive ring (HRR) on the physical NIC is configured to receive packets, wherein all packets received by the HRR are associated with a hardware address associated with one of the plurality of VNICs associated with the virtual switch.

5. The system of claim 1, wherein the first VNIC is associated with a first hardware address and the second VNIC is associated with a second hardware address.

6. A method for sending packets, comprising:
    receiving a packet from a first virtual network interface card (VNIC);
    processing the packet, wherein processing the packet comprises:
        obtaining a hardware address (HA) corresponding to a destination IP address of the packet;
        obtaining, using the hardware address, an entry in a Vswitch table associated with the HA, wherein the entry indicates that the packet is to be sent to a second VNIC;
        sending the packet to the second VNIC in accordance with the entry;
        receiving the packet by the second VNIC;
        sending the packet from the second VNIC to a third VNIC using a bridge component; and
        sending the packet, using the HA, from the third VNIC to a fourth VNIC, wherein the fourth VNIC is associated with a destination, and the destination is associated with the HA,
    wherein the first VNIC is associated with a first virtual network stack and the fourth VNIC is associated with a second virtual network stack,
    wherein a bridge comprises the second VNIC, the third VNIC, and the bridge component, and
    wherein the first and second virtual network stacks, the first and fourth virtual network interface cards, and the bridge are located within a single execution environment in a host.

7. The method of claim 6, wherein the destination associated with the HA comprises a virtual switch.

8. The method of claim 6, wherein the bridge is located in a Media Access Control (MAC) layer in the single execution environment of the host.

9. A computer readable storage medium comprising computer readable code, wherein the computer readable code, when executed, is configured to:
receive a packet from a first virtual network interface card (VNIC);
process the packet, wherein processing the packet comprises:
obtaining a hardware address (HA) corresponding to a destination IP address of the packet;
obtaining, using the hardware address, an entry in a Vswitch table associated with the HA, wherein the entry indicates that the packet is to be sent to a second VNIC;
sending the packet to the second VNIC in accordance with the entry;
receiving the packet by the second VNIC;
sending the packet from the second VNIC to a third VNIC using a bridge component; and
sending the packet, using the HA, from the third VNIC to a fourth VNIC, wherein the fourth VNIC is associated with a destination, and the destination is associated with the HA,
wherein the first VNIC is associated with a first virtual network stack and the fourth VNIC is associated with a second virtual network stack,
wherein a bridge comprises the second VNIC, the third VNIC, and the bridge component, and
wherein the first and second virtual network stacks, the first and fourth virtual network interface cards, and the bridge are located within a single execution environment in a host.

10. The computer readable medium of claim 9, wherein the destination associated with the HA comprises a virtual switch.

11. The computer readable medium of claim 9, wherein the bridge is located in a Media Access Control (MAC) layer in the single execution environment of the host.

12. The computer readable medium of claim 9, wherein the first VNIC is associated with a virtual machine.

* * * * *